April 10, 1934.  J. L. SHROYER  1,954,147
HEAT CONTROL SYSTEM
Filed Aug. 24, 1931
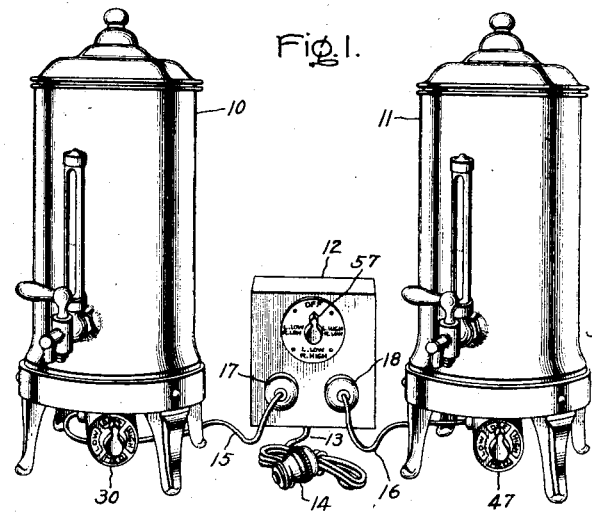
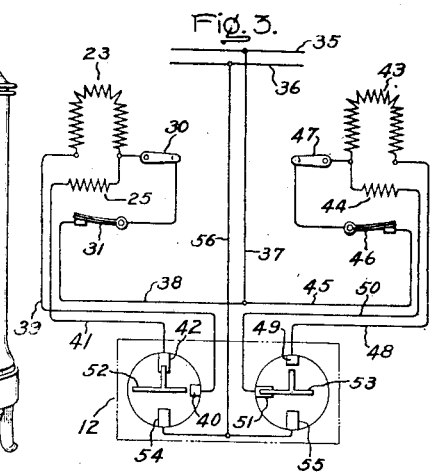
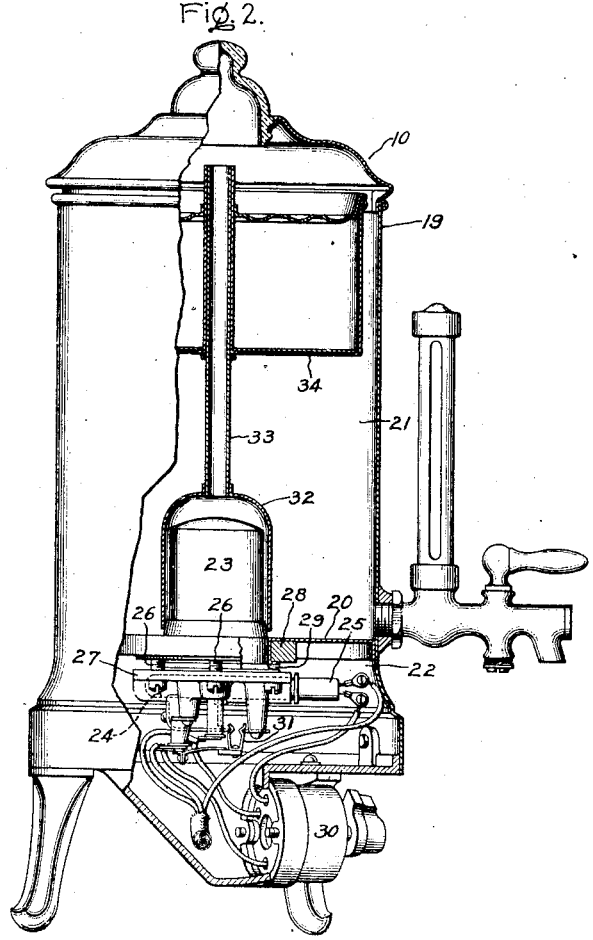
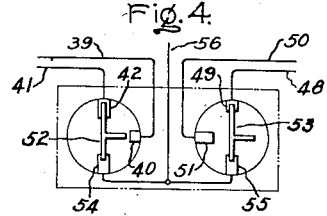
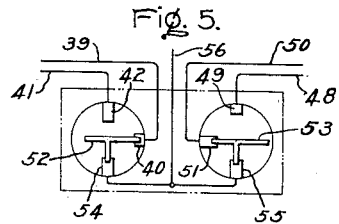
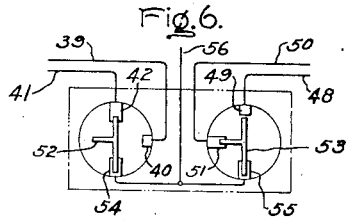
Inventor:
Jacob L. Shroyer,
by Charles E. Tullar
His Attorney.

Patented Apr. 10, 1934

1,954,147

UNITED STATES PATENT OFFICE 1,954,147

HEAT CONTROL SYSTEM

Jacob L. Shroyer, Oak Park, Ill., assignor to Edison General Electric Appliance Company, Chicago, Ill., a corporation of New York Application August 24, 1931, Serial No. 558,913

3 Claims. (Cl. 219—20)

My invention relates to heat control systems for a plurality of heating devices and more particularly to the control and assembly of the electrical heating units in a plurality of coffee urns and has for an object the provision of a single control means for limiting the total amount of power taken by the urns for varying operating conditions.

At present, the underwriters specify that only a given maximum amount of power may be drawn from a single convenience outlet or from a single circuit and when it is desired to operate several devices from a single outlet, the total watts of the devices exceeding the underwriters' limit, some provision must be made to prevent the units from drawing more than the prescribed limit.

In restaurants, trains or lunch counters the use of two coffee urns is generally sufficient to supply the demand. The proper proportions of coffee and water are added to one urn and heat applied until the preparation of the coffee has been completed. The heat applied to the prepared coffee is then diminished until only enough heat is applied to keep the coffee to the proper temperature. After a certain amount of coffee has been drawn from the urn, the second urn is placed in operation so that the second supply of coffee is ready before the first supply has been exhausted.

In carrying out my invention in one form I provide a single control means, such as a multi-position switch, to control the energization of the heating units for the operation of the urns so that the urns can be used successively as desired in preparing a batch of coffee while the combined energy input to the urns is limited to a predetermined value. The main heating units of these urns may have a rating of 1000 watts, while the maintaining units may have a rating of 100 watts, these values being sufficient for a one gallon urn. I wish it understood, however, that these values, while accurate for a one gallon urn, are not to be construed as a limitation upon my invention as it is obvious that it may be applied to urns of varying sizes. The multi-position switch, in one position, is arranged to energize the 1000 watt unit of one urn and the maintaining unit of 100 watts for the other urn. It will thus be observed that the coffee under preparation may be percolated in the minimum amount of time inasmuch as the maximum amount of heat is being applied to that particular urn. For the second position, the switch is arranged to reverse the relative connections to the respective urns and for a third position of the switch only the 100 watts units of the respective urns are connected. The reason for energizing the maintaining unit of one urn while the main unit of the other urn is energized, is to keep the prepared coffee warm, or in case of the initial operation to warm the water preparatory for the preparation of the second urn of coffee. Energization of the maintaining units alone, enables the brewing of two urns of coffee and the subsequent maintenance of the coffee at the proper temperature for consumption.

For a more complete understanding of my invention reference should now be had to the drawing in which Fig. 1 is a perspective view of two coffee urns and a single control switch therefor; Fig. 2 is a perspective view of a single coffee urn partly in section to show the arrangement of the heating parts and the connections thereto; Fig. 3 illustrates diagrammatically the connections to the heater elements from the single control switch; Figs. 4, 5 and 6 show the circuits completed by the single control switch in its various positions.

Referring to the drawing, I have shown my invention in one form as applied to the control of a pair of similarly constructed coffee urns 10 and 11. A single switch 12 is provided to control the connections of the separate heating units of each urn. To connect the urns to any suitable convenience outlet, I provide from switch 12 an extension cord 13 and a plug 14 of the usual type. The heating units of each urn are connected to the switch 12 by means of three conductor extension cords 15 and 16 and the plugs 17 and 18.

For details of the construction of a single urn, reference should be had to Fig. 2 wherein I have shown, for example, the urn 10 partly in section. It will be observed that a cylindrical casing 19 is divided into two parts by an annular dividing wall 20, the upper part 21 comprising a container for the coffee and the lower part 22 providing a housing for the heating units. The main heating unit 23 extends upwardly through a suitable aperture provided for it in the dividing wall 20, the lower part of the unit having a bore 24 into which a maintaining heater 25 of suitable construction is removably mounted. The main heating unit 23 is held in position by any suitable means such as by a number of studs 26 extending through a flange 27 provided on the main heater 23 and threadedly engaging an annular ring 28 secured to the dividing wall 20. To prevent leakage through this joint a gasket 29 is interposed between the ring 28 and the flange 27. There is also mounted in the base of the urn a multi-position switch 30 which may under certain conditions be utilized to independently control the connections to the heating unit. To protect the urn from overheating in case it should run dry, I provide a thermostatic switch 31 of suitable construction such as described and claimed in U. S. Patent to Simmons 1,743,073, in series with the heater and mounted on the main heating unit 23. Surrounding the main heating unit 23 is a suitable percolator pump 32 having a tube 33 extending above a coffee container 34 which is supported by the tube in a well known manner. It will of course be understood that the urn 11 is similarly constructed.

The plug 14 may be attached to any suitable convenience outlet establishing electrical connections with a suitable source of supply as indicated in Fig. 3 by the supply lines 35 and 36. It will be noticed that one side of the main heating unit 23 of the urn 10 is connected to one side of the maintaining unit 25. To this point of juncture the supply line 35 is directly connected by conductor 37, conductor 38, the thermostatic switch 31 and the manually operated switch 30. The other side of main heater 23 is connected through a conductor 39 to a contact 40 of the switch 12; the other side of the maintaining heater 25 is connected through a conductor 41 to the switch contact 42. The urn 11 is similarly connected, the point of juncture of the main heating unit 43 and the maintaining unit 44 being connected to the supply line 35 by the conductor 37, conductor 45, a thermostatic switch 46 and a manually operable switch 47. The other side of the main heating unit 43 is connected by conductor 48 to contact 49 on switch 12, the other side of the maintaining unit being connected by a conductor 50 to contact 51 on the switch 12. In Fig. 3 the switch 12 is shown in the off position, the bridging members 52 and 53 not serving to connect the contacts 54 and 55 which are directly connected by conductor 56 to the supply line 36.

The bridging members 52 and 53 are mounted on the shaft carrying the operating handle 57 of the switch 12 each bridging member cooperating with its respective contact points in the manner shown in Figs. 3–6 inclusive, for the various positions of the operating handle.

With the above understanding of the elements forming an embodiment of my invention, the operation is as follows: It will be assumed that both urns have been filled with the proper amounts of coffee and water and that it is desired to first percolate the coffee in the urn 11. The operating handle 57 of the switch 12 is rotated in a clockwise direction to the first position shown in Fig. 4. One bridging member 53 completes an energizing circuit for the main heating unit of the urn 11 which circuit may be traced from the supply line 36, conductor 56, contact 55, bridging member 53, contact 49, conductor 48, main unit 43, switch 47, thermostatic switch 46, and by conductors 45 and 37 to the other supply line 35. The other bridging member serves to energize the maintaining unit 25 of the urn 10 through a circuit which may be traced from the supply line 36, conductor 56, contact 54, bridging member 52, conductor 41, maintaining unit 31, switch 30, thermostatic switch 25, and by conductors 37 and 38 to the other supply line 35.

After the coffee has percolated the required time in the urn 11, it being understood that the maintaining unit 25 has at the same time warmed the water in the urn 10, the operating handle 57 of the switch 12 is turned to its second position the bridging members 52 and 53 taking the positions shown in Fig. 5. The main heating unit 23 of the urn 10 is thereby energized and the maintaining unit of the urn 11 which serves to keep the coffee in the urn 11 at the proper temperature for consumption is also energized through a circuit which may be traced from the supply line 36 by conductor 56, contact 55, bridging member 53, contact 51, thence by conductor 50 to the maintaining unit 44 and through switches 47 and 46 and conductors 37 and 45 to the other supply line 35. The circuit for the urn 10 may be traced from supply line 36, conductor 56, contact 54, bridging member 52, contact 40, thence by conductor 39 to the main heater 23, the circuit as before being completed through switches 30 and 31 and conductors 37 and 38 to the other supply line 35.

By turning switch 12 to its third position as shown in Fig. 6, the maintaining units 25 and 44 of urns 10 and 11 are alone energized, the bridging member 52 completing the circuit from the supply line 36 through contacts 54 and 42 to maintaining unit 25 and back to the supply line 35; the other bridging member 53 completing the circuit from supply line 36 through contacts 55 and 51 to the maintaining unit 44 of the urn 11 and thence to the other supply line 35.

Should it be desired to disconnect either of the urns the manually operated switches 30 and 47 are arranged respectively to disconnect the urns 10 and 11 from the supply line 35.

In Fig. 1, it will be observed that switches 30 and 47 have been illustrated as multi-position switches and it will be understood that for the single control of both urns the switches 30 and 47 serve the simple function of breaking the respective circuits from the supply line 35 to the heating units of the urns.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A heat control system for two coffee urns including a main heating element and a maintaining element for each urn, a single heat control means comprising a multi-position switch arranged to energize the main heating element of one urn while energizing the maintaining element of the other urn for one position, and for a second position to energize the main heating element of the other urn while energizing the maintaining element of the first urn, and for a third position to energize only the maintaining elements of both urns whereby the total amount of power which said urns may consume is limited to a predetermined amount.

2. In combination, a pair of coffee urns each of which is provided with a liquid container having a main heating element extending upwardly from the bottom of said liquid container and provided with an enlarged end portion in which is formed a bore and a maintaining element slidably mounted in said bore and located below the bottom of said container, of means for limiting the total power consumption of said urns comprising a multi-position switch arranged to energize the main heating element of one urn while energizing the maintaining element of the other urn for one position and for a second position to energize the main heating element of the other urn while energizing the maintaining element of the first urn, and for a third position to energize only the maintaining elements of both of said urns.

3. In combination, a pair of coffee urns each of which is provided with a liquid container, a heating resistor of high capacity and a resistor of low capacity, a single multi-position control switch, connections for connecting said resistors of said urns to said switch so that for one position of said switch the high capacity resistor of one urn and the low capacity resistor of said other urn are energized and for a second position of said switch said low capacity resistor of said one urn and the high capacity resistor of said other urn are energized, and for a third position of said switch said low capacity resistors of said urns are energized, a pair of snap switches one of which is carried by each urn, said connections including each of said switches between said resistors and said control switch so that either of said urns can be disconnected from said control switch by the operation of a selected snap switch.

JACOB L. SHROYER.